United States Patent
Kim et al.

(10) Patent No.: US 12,043,106 B2
(45) Date of Patent: Jul. 23, 2024

(54) MOUNTING STRUCTURE OF COOLING DEVICE FOR VEHICLE

(71) Applicants: Hyundai Motor Company, Seoul (KR); Kia Corporation, Seoul (KR); Hanon Systems, Daejeon (KR)

(72) Inventors: Yeonho Kim, Seoul (KR); Eon Soo Yun, Hwaseong-si (KR); Jae Yeon Kim, Hwaseong-si (KR); Hoyoung Jeong, Daegu (KR); Ok Ryul Min, Daejeon (KR); Sung-Wook Park, Daejeon (KR); Jung Sam Gu, Daejeon (KR)

(73) Assignees: HYUNDAI MOTOR COMPANY, Seoul (KR); KIA CORPORATION, Seoul (KR); HANON SYSTEMS, Daejeon (KR)

( * ) Notice: Subject to any disclaimer, the term of this patent is extended or adjusted under 35 U.S.C. 154(b) by 50 days.

(21) Appl. No.: 17/950,368

(22) Filed: Sep. 22, 2022

(65) Prior Publication Data
US 2023/0391183 A1 Dec. 7, 2023

(30) Foreign Application Priority Data
Jun. 2, 2022 (KR) .......................... 10-2022-0067687

(51) Int. Cl.
*B60K 11/04* (2006.01)
(52) U.S. Cl.
CPC .................................... *B60K 11/04* (2013.01)
(58) Field of Classification Search
CPC ............................... B60K 11/04; B60K 11/085
See application file for complete search history.

(56) References Cited

U.S. PATENT DOCUMENTS

| 3,123,170 A | * | 3/1964 | Bryant | ................... | B60K 11/04 165/69 |
| 4,821,828 A | * | 4/1989 | Schwerzler | ............. | F16F 7/108 181/207 |

(Continued)

FOREIGN PATENT DOCUMENTS

| EP | 178266 A | * | 4/1986 | ............. B60K 11/04 |
| JP | 2014210466 A | * | 11/2014 | |
| JP | 2018016297 A | * | 2/2018 | ............. B60K 11/04 |

OTHER PUBLICATIONS

Shigeki Yamaoka, Radiator Assembly Structure, Nov. 13, 2014, EPO, JP 2014-210466 A, Machine Translation of Description (Year: 2014).*

*Primary Examiner* — James A English
(74) *Attorney, Agent, or Firm* — SLATER MATSIL, LLP

(57) ABSTRACT

A mount structure of a cooling device for a vehicle includes first mounting units respectively provided at an upper part on left and right sides of the cooling device along a width direction of the vehicle and disposed toward a front-rear direction, the width direction, or a height direction of the vehicle, second mounting units respectively provided at a lower part on the left and right sides of the cooling device along the width direction of the vehicle and disposed toward the front-rear direction, the width direction, or the height direction of the vehicle, and a bush unit to which the first mounting units and the second mounting units are mounted to mount the cooling device to a vehicle body of the vehicle.

18 Claims, 10 Drawing Sheets

(56) References Cited

U.S. PATENT DOCUMENTS

| | | | | |
|---|---|---|---|---|
| 6,273,182 B1* | 8/2001 | Pautler | ............... | F28F 9/002 |
| | | | | 165/140 |
| 10,946,736 B2* | 3/2021 | Fischer | ............ | B60K 17/34 |
| 2005/0062315 A1* | 3/2005 | Andritter | ........ | B62D 25/084 |
| | | | | 296/193.09 |
| 2007/0246280 A1* | 10/2007 | Maeda | ............... | B60K 11/04 |
| | | | | 180/68.4 |

* cited by examiner

MOUNTING STRUCTURE OF COOLING DEVICE FOR VEHICLE

CROSS-REFERENCE TO RELATED APPLICATIONS

This application claims the benefit of Korean Patent Application No. 10-2022-0067687, filed on Jun. 2, 2022, which application is hereby incorporated herein by reference.

TECHNICAL FIELD

The present invention relates to a mount structure of a cooling device for a vehicle.

BACKGROUND

Recently, the vehicle industry has been introducing a new concept of future mobility vision for realizing a human-centered and dynamic future city.

One of these future mobility solutions is a PBV as a purpose built mobility.

The PBV is an environment-friendly mobility solution that provides customized services necessary for occupants during the time of moving to the destination on the ground, and it may also perform setting of an optimal path and cluster driving for each situation using electric vehicle-based and artificial intelligence.

In other words, the PBV is a means of transportation and a fixed facility in which case-related technologies are concentrated, and has an autonomous driving function so that a separate driver's seat is unnecessary. In addition, the indoor space has substantial expandability.

This PBV may be changed not only to a role of a shuttle that moves a plurality of people, but also to recreational spaces such as restaurants, cafes, hotels, and movie theaters, and socially essential facilities such as hospitals and pharmacies.

Here, the PBV is moved using an electric motor for power, and consists of a skateboard-type rolling chassis (also called an underbody or a skateboard in the industry) in which a battery is widely spread on the lower part, and an upper vehicle body that may accommodate an occupant.

The PBV configured in this way is equipped with an air conditioner for controlling the indoor temperature of the upper vehicle body, and a thermal management module that supplies a coolant or a refrigerant to the air conditioner, however, there is a problem in that it is difficult to dispose each constituent element of the thermal management module in a narrow mounting space, and the layout of pipes through which the coolant or the refrigerant flows is complicated.

In addition, due to the limitation of the mounting space of the rolling chassis, the constituent elements of the thermal management module or the constituent elements of the air conditioner must be mounted on the upper vehicle body, and there is also a problem in that the internal space of the upper vehicle body is reduced.

In addition, there are problems such as deterioration of insulation performance and durability of the cooling device due to a vibration transmitted to the cooling device during the vehicle driving.

In order to solve these problems, there is a need to develop a technology for more stably mounting the cooling device on the rolling chassis.

The above information disclosed in this background section is only for enhancement of understanding of the background of embodiments of the invention, and therefore it may contain information that does not form the prior art that is already known to a person of ordinary skill in the art.

SUMMARY

The present invention relates to a mount structure of a cooling device for a vehicle. Particular embodiments relate to a mount structure of a cooling device for a vehicle that allows a cooling device to be stably mounted while minimizing a mounting space in front of a vehicle body in a purpose built vehicle (PBV).

Therefore, embodiments of the present invention can solve problems in the art, and embodiments of the present invention provide a mount structure of a cooling device for a vehicle that allows a cooling device to be stably mounted while minimizing a mounting space to secure vibration insulating performance and to provide durability in front of a vehicle body in a PBV.

A mount structure of a cooling device for a vehicle according to an embodiment of the present invention includes a cooling device including a radiator and a cooling fan, first mounting units respectively formed at an upper part on left and right sides of the cooling device along a width direction of a vehicle and disposed toward any direction among a front-rear direction (a length direction), a width direction (a left-right direction), or a height direction (an up-down direction) of a vehicle, second mounting units formed at a lower part on left and right sides of the cooling device along the width direction of the vehicle, respectively, and disposed toward one direction among a front-rear direction (a length direction), a width direction (a left-right direction), or a height direction (an up-down direction) of a vehicle, and at least one bush unit to which the first and second mounting units are mounted and mounting the cooling device to a vehicle body, and the cooling device may be disposed to be inclined at a predetermined angle so that the upper part is positioned higher than the lower part based on the height direction of the vehicle.

The first mounting unit may include first mounting bodies respectively formed at the upper part on left and right sides of the cooling device based on the width direction of the vehicle and first mounting pins formed to respectively protrude from the first mounting body toward left and right sides based on the width direction of the vehicle.

The second mounting unit may include second mounting bodies respectively formed at the lower part on left and right sides of the cooling device based on the width direction of the vehicle and second mounting pins respectively formed to be protruded downward from the second mounting bodies based on the height direction of the vehicle.

The first mounting unit may include first mounting bodies respectively formed at the upper part on left and right sides of the cooling device based on the width direction of the vehicle and first mounting pins respectively formed to be protruded from the first mounting bodies toward the rear of the vehicle based on the front-rear direction of the vehicle.

The second mounting unit may include second mounting bodies respectively formed at the lower part on left and right sides of the cooling device based on the width direction of the vehicle and second mounting pins respectively formed to be protruded from the second mounting bodies toward the left-right direction with respect to the width direction of the vehicle.

The first mounting unit may include first mounting bodies respectively formed at the upper part on left and right sides of the cooling device based on the width direction of the vehicle and first mounting pins respectively formed to be protruded from each first mounting body toward the left and right based on the width direction of the vehicle.

The second mounting unit may include second mounting bodies formed at the bottom on left and right sides of the cooling device based on the width direction of the vehicle and second mounting pins respectively formed to be protruded from each second mounting body toward the front of the vehicle based on the front-rear direction of the vehicle.

The cooling device may further include connection frames fixing the radiator and the cooling fan on the left and right sides based on the width direction of the vehicle and respectively formed with the first and second mounting units.

The bush unit may include a mounting bracket fixedly mounted on the vehicle body and including a mount hole, an insulator mounted on the mount hole and including a penetration hole formed in the center, and an inner pipe mounted on the penetration hole.

According to the mount structure of the cooling device for the vehicle according to an embodiment of the present invention as described above, in the PBV, it is possible to secure vibration insulation performance and improve durability by stably mounting the cooling device while minimizing the mounting space in front of the vehicle body.

In addition, in embodiments of the present invention, the cooling device is obliquely disposed at the predetermined angle, and two axis supporting structures for supporting two directions of the vertical direction, the left-right direction, or the front-rear direction at both sides in the width direction of the vehicle are applied, thereby the overall stress distribution acting on the cooling device is advantageous, and the mount stability and the durability of the mounting unit may be improved.

In addition, in embodiments of the present invention, the layout may be simplified in the narrow vehicle front space of the PBV, and the interior space of the vehicle that may be applied for various purposes may be maximized.

Figure 1:
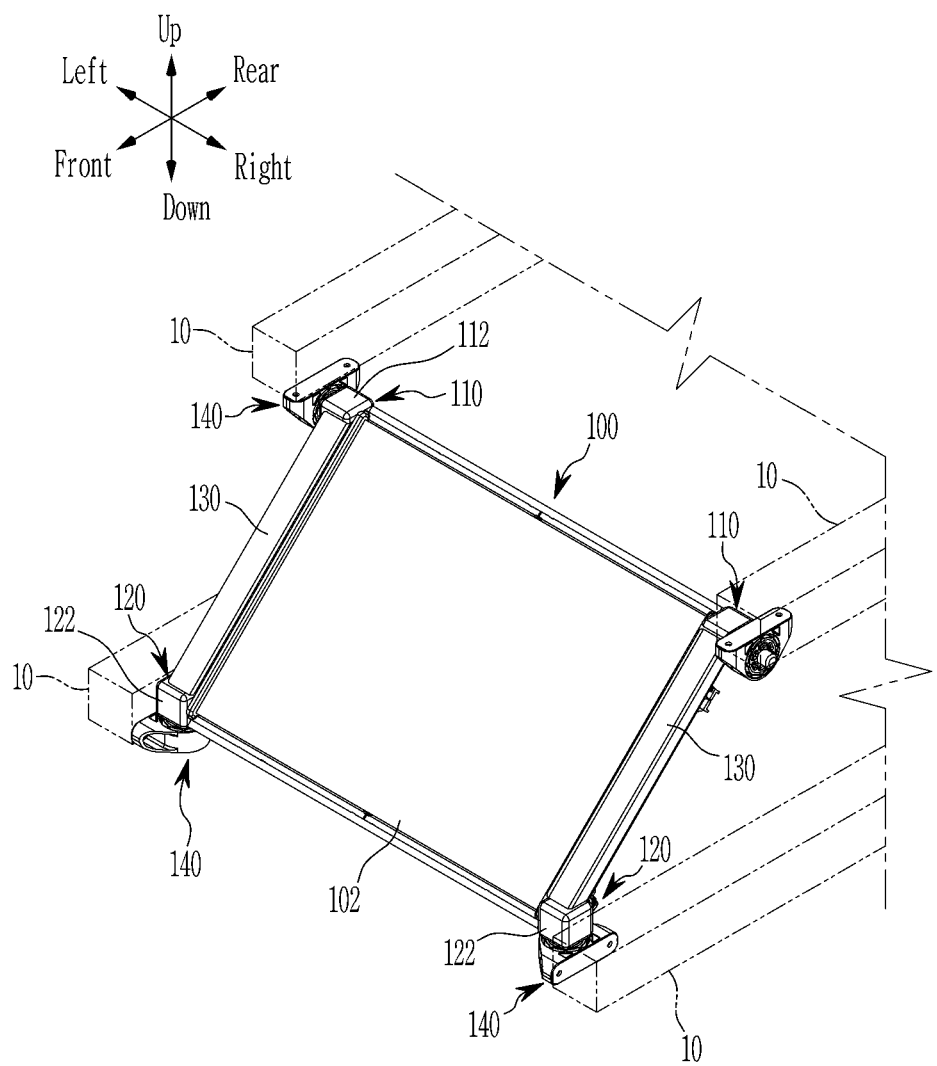
FIG. 1 is a partial front perspective view of a vehicle body to which a mount structure of a cooling device for a vehicle according to a first embodiment of the present invention is applied.

The following reference identifiers may be used in connection with the accompanying drawings to describe exemplary embodiments of the present disclosure.

| | |
|---|---|
| 10 | vehicle body |
| 100, 200, 300 | cooling device |
| 102, 202, 302 | radiator |
| 104, 204, 304 | cooling fan |
| 110, 210, 310 | first mounting unit |
| 112, 212, 312 | first mounting body |
| 114, 214, 314 | first mounting pin |
| 120, 220, 320 | second mounting unit |
| 122, 222, 322 | second mounting body |
| 124, 224, 324 | second mounting pin |
| 130, 230, 330 | connection frame |
| 140 | bush unit |

DETAILED DESCRIPTION OF ILLUSTRATIVE EMBODIMENTS

Embodiments of the present invention will hereinafter be described in detail with reference to the accompanying drawings.

Prior to this, configurations illustrated in the embodiments and drawings disclosed in the present specification are only the most preferred embodiments of the present invention and do not represent all of the technical spirit of the present invention, and thus it is to be understood that various equivalents and modified examples, which may replace the configurations, are possible when filing the present application.

The drawings and description are to be regarded as illustrative in nature and not restrictive, and like reference numerals designate like elements throughout the specification.

Since size and thickness of each component illustrated in the drawings are arbitrarily represented for convenience in explanation, the present invention is not particularly limited to the illustrated size and thickness of each component and the thickness is enlarged and illustrated in order to clearly express various parts and areas.

In addition, throughout the specification, unless explicitly described to the contrary, the word "comprise", and variations such as "comprises" or "comprising", will be understood to imply the inclusion of stated elements but not the exclusion of any other elements.

In addition, the terms "unit", "means", "part", and "member", which are described in the specification, mean a unit of a comprehensive configuration that performs at least one function or operation.

FIG. 1 is a partial front perspective view of a vehicle body to which a mount structure of a cooling device for a vehicle according to a first embodiment of the present invention is applied.

The embodiments of the present invention may be applied to, for example, a purpose built vehicle (hereinafter referred to as a PBV).

The PBV may be defined as an environment-friendly vehicle that is electric vehicle-based and provides a customized service for passengers while traveling to a destination.

The PBV may be capable of setting an optimal path for each situation and performing platooning, and furthermore, may be a box-type design vehicle having a large interior space.

Such a PBV includes a skateboard-like rolling chassis (also referred to as an underbody in the art) and an upper body mounted on the rolling chassis.

A battery assembly may be mounted on the rolling chassis, and a driving motor (not illustrated) may be installed.

Referring to FIG. 1, the mount structure of the cooling device for the vehicle according to the first embodiment of the present invention may be applied to stably mount the cooling device 100 to the vehicle body 10 of the rolling chassis. The vehicle body 10 may include a front side member and the like.

The cooling device 100 may be disposed to be inclined at a predetermined angle so that the upper part is positioned higher than the lower part based on the height direction of the vehicle.

Hereinafter, the mount structure of the cooling device for the vehicle according to the first embodiment of the present invention is described in detail with reference to FIG. 2 to FIG. 6.

Figure 2:
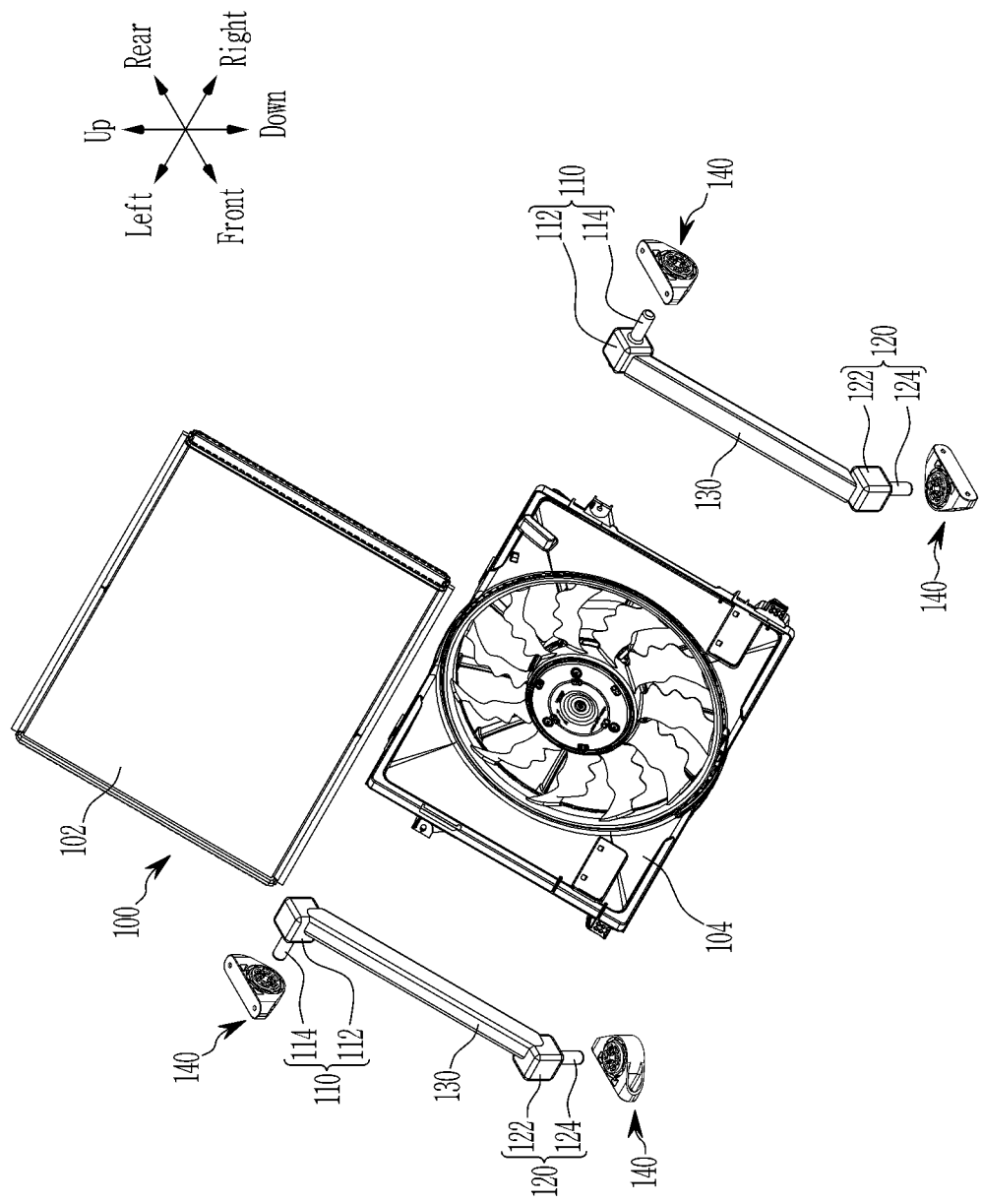
FIG. 2 is an exploded perspective view of a mount structure of a cooling device for a vehicle according to a first embodiment of the present invention.
Figure 3:
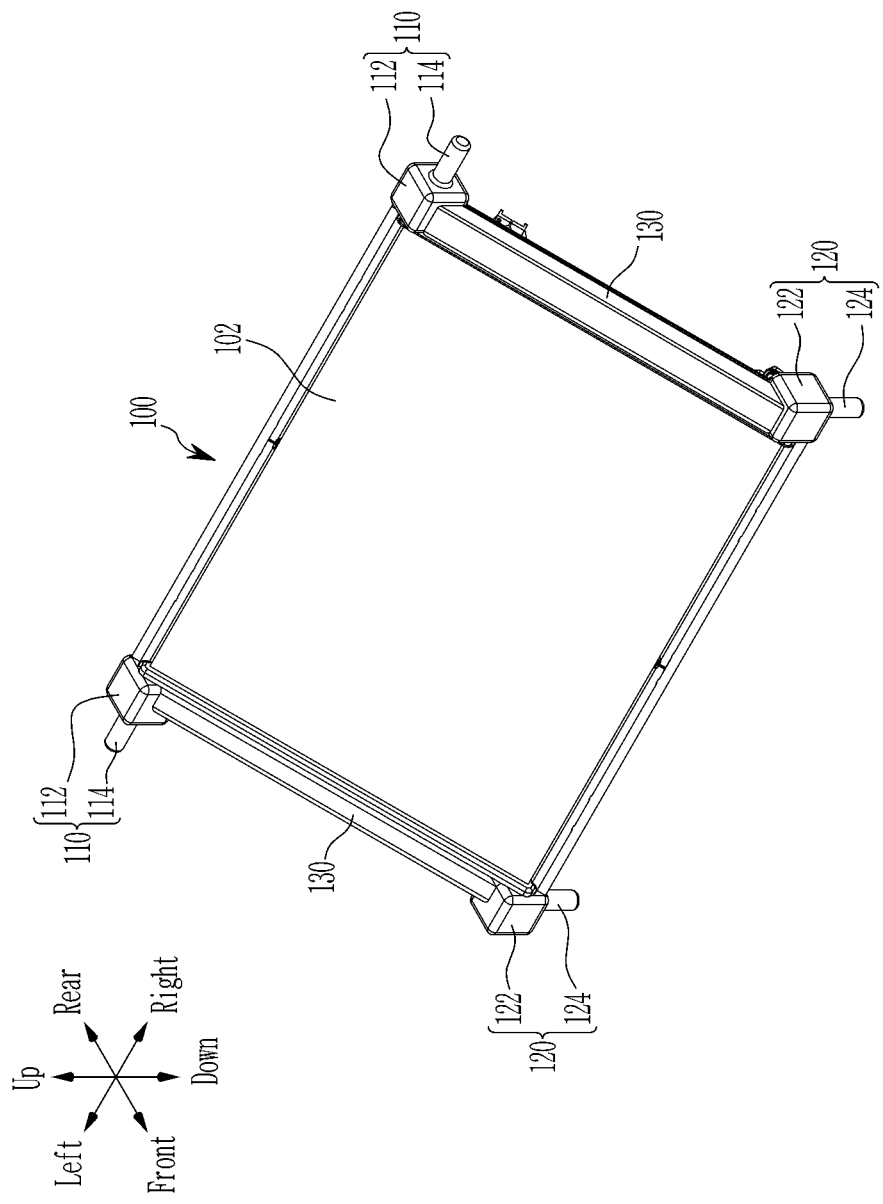
FIG. 3 is a front perspective view of a mount structure of a cooling device for a vehicle according to a first embodiment of the present invention.
Figure 4:
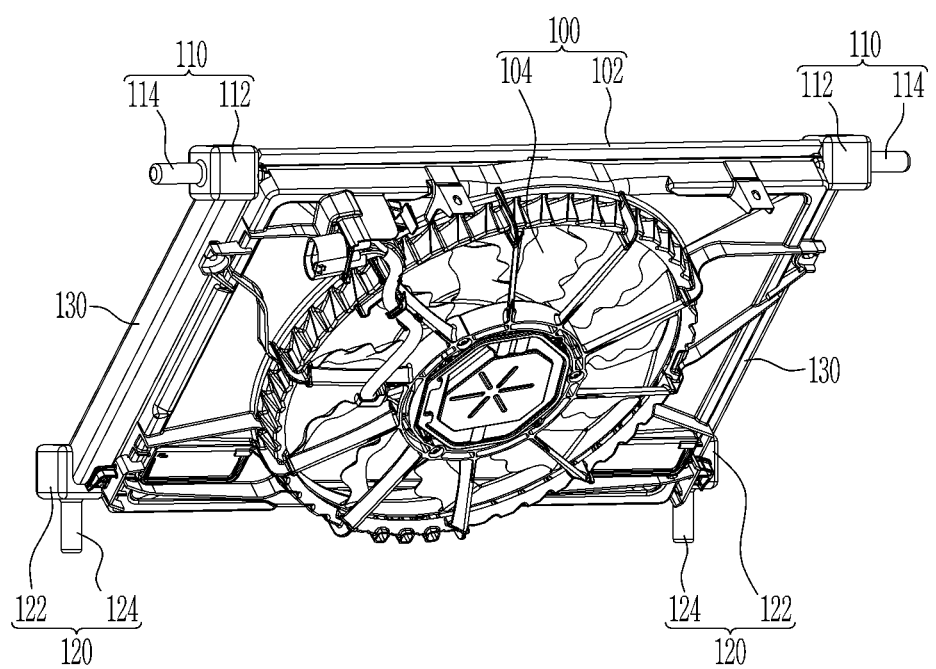
FIG. 4 is a rear perspective view of a mount structure of a cooling device for a vehicle according to a first embodiment of the present invention.
Figure 5:
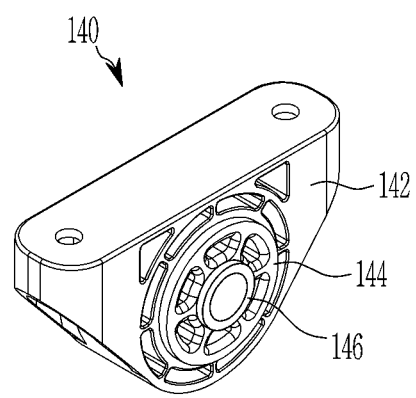
FIG. 5 is a perspective view of a bush unit applied to a mount structure of a cooling device for a vehicle according to a first embodiment of the present invention.
Figure 6:
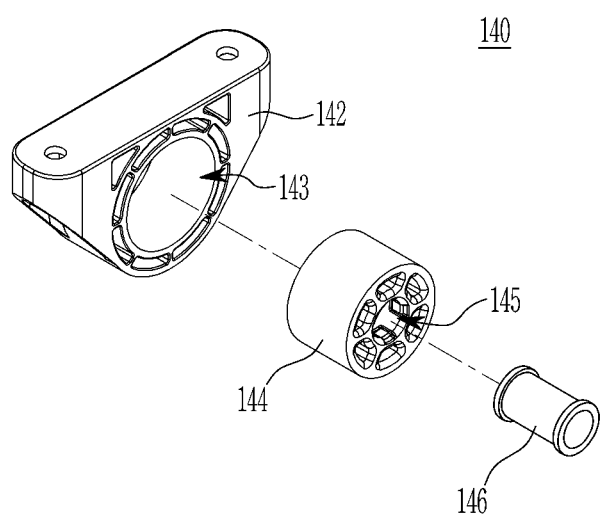
FIG. 6 is an exploded perspective view of a bush unit applied to a mount structure of a cooling device for a vehicle according to a first embodiment of the present invention.

FIG. 2 is an exploded perspective view of a mount structure of a cooling device for a vehicle according to a first embodiment of the present invention, FIG. 3 is a front perspective view of a mount structure of a cooling device for a vehicle according to a first embodiment of the present invention, FIG. 4 is a rear perspective view of a mount structure of a cooling device for a vehicle according to a first embodiment of the present invention, FIG. 5 is a perspective view of a bush unit applied to a mount structure of a cooling device for a vehicle according to a first embodiment of the present invention, and FIG. 6 is an exploded perspective view of a bush unit applied to a mount structure of a cooling device for a vehicle according to a first embodiment of the present invention.

In the first embodiment of the present invention, the mount structure of the cooling device, as shown in FIG. 2 to FIG. 4, includes a cooling device 100, a first mounting unit no, a second mounting unit 120, and at least one bush unit 140.

In the first embodiment of the present invention, the cooling device 100 may include a radiator 102 and a cooling fan 104.

The radiator 102 may cool the coolant that has flowed inside through heat-exchange with the outside air that is inflowed while the vehicle is running. Also, the cooling fan 104 is mounted at the rear of the radiator 102 based on the front-rear direction of the vehicle.

The cooling device 100 configured in this way cools the coolant through the operation of the cooling fan 104 and heat-exchange with the outside air.

On the other hand, in the present embodiments, it is described that the cooling device 100 includes the radiator 102 and the cooling fan 104 as an embodiment, but it is not limited thereto, and a heat-exchanger such as a condenser for heat-exchanging the refrigerant with the outside air may be further included.

In the first embodiment of the present invention, the first mounting units 110 may be respectively formed on the upper part on the left and right sides of the cooling device 100 along the width direction of the vehicle.

The first mounting unit no may be disposed toward any one of the vehicle's front-rear direction (a length direction), a left-right direction (a width direction), or a vertical direction (a height direction).

In the first embodiment of the present invention, the first mounting unit no may be disposed toward the left-right direction, which is the width direction of the vehicle.

Here, the first mounting unit no may include a first mounting body 112 and a first mounting pin 114 (referring to FIG. 3).

First, the first mounting body 112 may be formed on the upper part on the left and right sides of the cooling device 100 based on the width direction of the vehicle.

Also, the first mounting pins 114 may be formed to be protruded from the first mounting body 112 toward the left and right, respectively, based on the width direction of the vehicle.

In the first embodiment of the present invention, the second mounting units 120 may be respectively formed in the lower portion on the left and right sides of the cooling device 100 along the width direction of the vehicle.

The second mounting unit 120 may be disposed toward any one of the front-rear direction (the length direction), the width direction (the left-right direction), or the height direction (the up and down direction) of the vehicle.

Here, the second mounting unit 120 may be disposed toward one direction except for the arrangement direction of the first mounting unit no among the front-rear direction (the length direction), the width direction (the left-right direction), or the height direction (the up and down direction) of the vehicle.

That is, in the first embodiment of the present invention, the second mounting unit 120 may be formed toward the vertical direction, which is the height direction of the vehicle.

The second mounting unit 120 thus configured may include a second mounting body 122 and a second mounting pin 124 (referring to FIG. 3 and FIG. 4).

First, the second mounting body 122 may be formed in the lower part on the left and right sides of the cooling device 100 based on the width direction of the vehicle.

The second mounting pins 124 may be formed to protruded downward from the second mounting body 122, respectively, based on the height direction of the vehicle.

On the other hand, in the first embodiment of the present invention, the cooling device 100 may further include a connection frame 130.

The connection frame 130 may fix the radiator 102 and the cooling fan 104 on the left and right sides based on the width direction of the vehicle. In addition, the first and second mounting units 110 and 120 may be respectively formed on the upper and lower portions of the connection frame 130.

That is, in the mount structure of the cooling device according to the first embodiment of the present invention, both upper sides of the cooling device 100 may be supported in the width direction of the vehicle and both lower sides of the cooling device 100 may be supported from the lower part based on the vertical direction of the vehicle.

Accordingly, the cooling device 100 may be supported on the vehicle body 10 in the width direction and the vertical direction of the vehicle.

Also, at least one bush unit 140 may be mounted with the first and second mounting units 110 and 120, and the cooling device 100 may be mounted to the vehicle body 10.

This bush unit 140 may minimize the vibration and noise generated during the driving of the vehicle and the vibration and noise generated during the operation of the cooling device 100 to be transmitted to the vehicle body 10. In addition, the bush unit 140 minimizes the vibration and an impact force generated during the driving of the vehicle to be transmitted to the cooling device 100.

Here, the bush unit 140, as shown in FIG. 5 and FIG. 6, may include a mounting bracket 142, an insulator 144, and an inner pipe 146.

First, the mounting bracket 142 may fixedly mounted on the vehicle body 10, and a mount hole 143 may be formed in the center.

The insulator 144 may be mounted in the mount hole 143, and a penetration hole 145 may be formed in the center.

Also, the inner pipe 146 may be mounted in the penetration hole 145.

The first mounting pin 114 or the second mounting pin 124 may be inserted into this inner pipe 146.

Here, the insulator 144 may be adhered between the interior circumference of the mount hole 143 and the exterior circumference of the inner pipe 146.

The bush unit 140 configured in this way may mount the cooling device 100 to the vehicle body 10 more stably. At the same time, the bush unit 140 may minimize the vibration, the noise, and the impact force transmitted to the vehicle body 10 or the cooling device 100.

The mount structure of the cooling device 100 according to the first embodiment of the present invention configured in this way is a two-axis support structure supporting the cooling device 100 by the first mounting unit no and the second mounting unit 120 in two different directions among the front-rear direction, the width direction, or the height direction of the vehicle and may support the front of the vehicle.

That is, the first mounting unit no and the second mounting unit 120 support the cooling device 100 in two axis directions among three axes of the front-rear, left and right, and vertical directions of the vehicle, thereby more efficiently distributing the stress input to the cooling device 100 in accelerating, decelerating, and turning conditions of the vehicle.

In addition, according to the first embodiment of the present invention, as the mount structure of the cooling device 100 mounts the cooling device 100 in front of the vehicle body 10 to be inclined with a predetermined angle, the mount height of the cooling device 100 may be reduced compared to the prior art, a height direction package becomes advantageous, and a design freedom degree of the front of the vehicle may be secured.

Therefore, when the mount structure of the cooling device for the vehicle according to the first embodiment of the present invention configured as described above is applied, in the PBV, it is possible to secure vibration insulation performance and improve durability by stably mounting the cooling device 100 while minimizing the mounting space in front of the vehicle body 10.

In addition, embodiments of the present invention dispose the cooling device 100 obliquely at the predetermined angle and apply two axis supporting structures for supporting two directions of the vertical direction, the left-right direction, or the front-rear direction at both sides in the width direction of the vehicle, thereby the overall stress distribution acting on the cooling device 100 is advantageous, and the mount stability and durability of the mounting unit may be improved.

In addition, embodiments of the present invention may simplify the layout in the narrow vehicle front space of the PBV and maximize the interior space of the vehicle that may be applied for various purposes.

The mount structure of the cooling device for the vehicle according to the second embodiment of the present invention is described with reference to FIG. 7 and FIG. 8.

Figure 7:
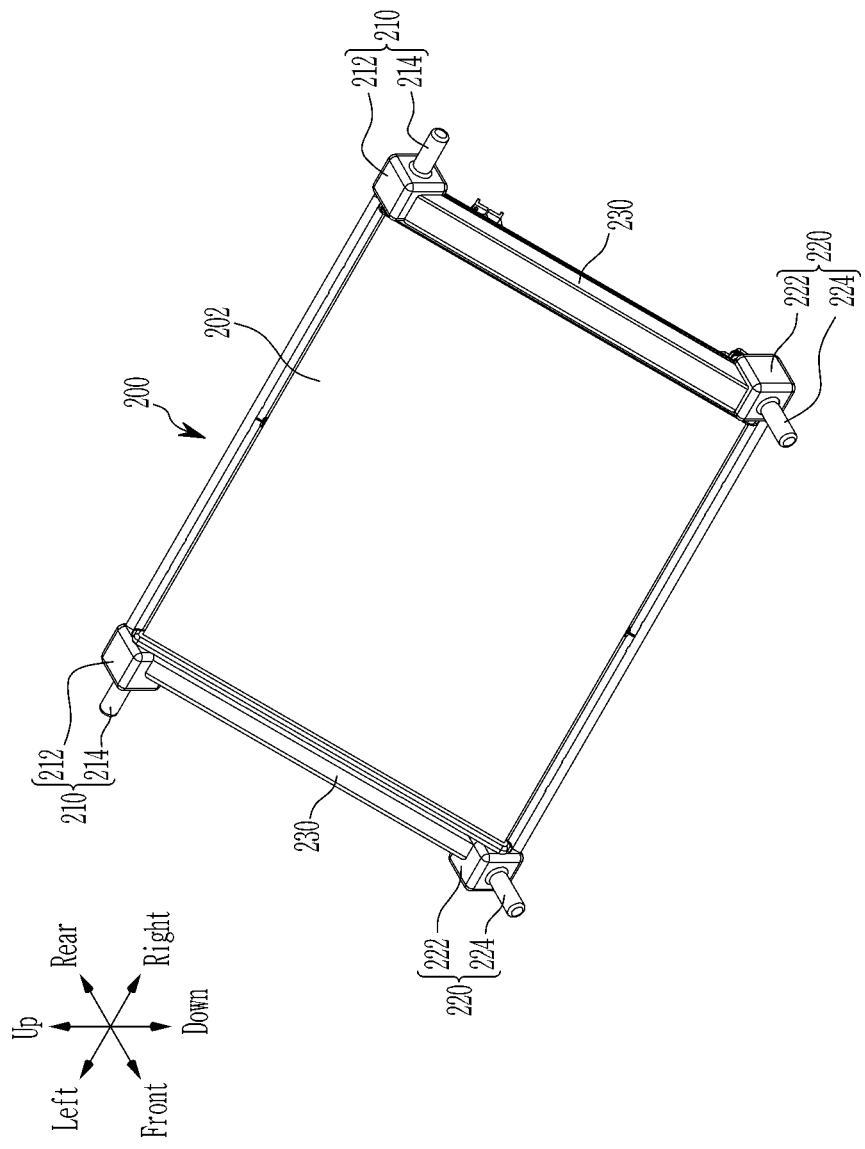
FIG. 7 is a front perspective view of a mount structure of a cooling device for a vehicle according to a second embodiment of the present invention.
Figure 8:
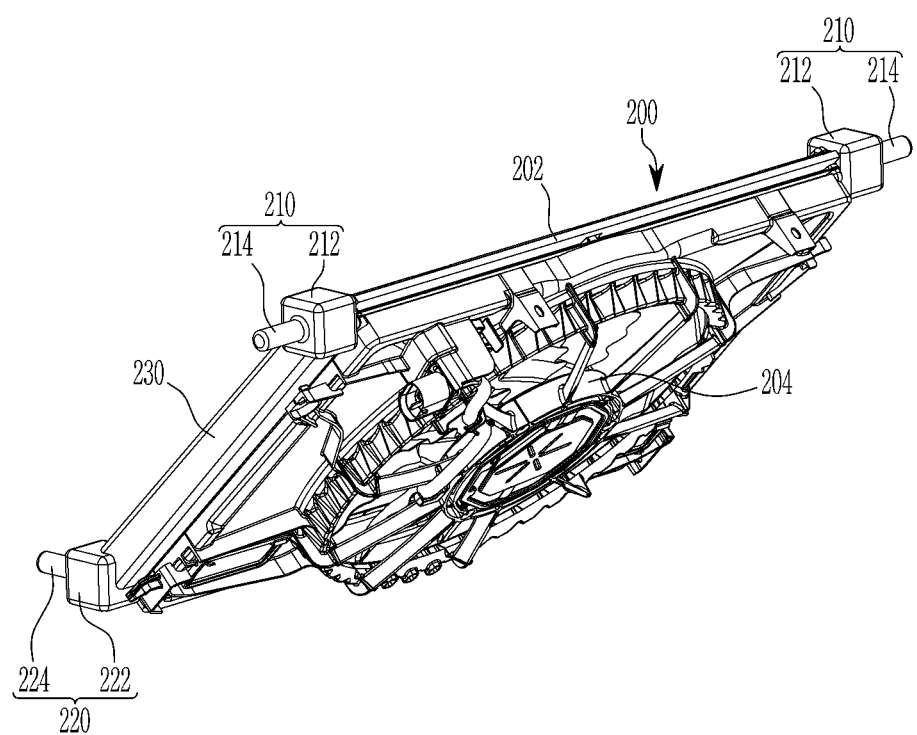
FIG. 8 is a rear perspective view of a mount structure of a cooling device for a vehicle according to a second embodiment of the present invention.

FIG. 7 is a front perspective view of a mount structure of a cooling device for a vehicle according to a second embodiment of the present invention, and FIG. 8 is a rear perspective view of a mount structure of a cooling device for a vehicle according to a second embodiment of the present invention.

First, in the second embodiment of the present invention, the mount structure of the cooling device, as shown in FIG. 7 and FIG. 8, includes the cooling device 200, the first mounting unit 210, the second mounting unit 220, and at least one bush unit 140.

Here, since the bush unit 140 is the same as the first embodiment described above, a detailed description of the bush unit 140 is omitted below.

In the second embodiment of the present invention, the cooling device 200 may include a radiator 202 and a cooling fan 204.

The radiator 202 may cool the inflowing coolant through heat-exchange with the inflowing outside air while the vehicle is running. The cooling fan 204 is mounted at the rear of the radiator 202 based on the vehicle's front-rear direction.

The cooling device 200 configured in this way cools the coolant through the operation of the cooling fan 204 and heat-exchange with the outside air.

On the other hand, in the present embodiments, the cooling device 200 is described as an embodiment including the radiator 202 and the cooling fan 204, but it is not limited thereto, and may further include a heat-exchanger such as a condenser for heat-exchanging the refrigerant with the outside air.

In the second embodiment of the present invention, the first mounting units 210 may be respectively formed on the upper part on the left and right sides of the cooling device 200 along the width direction of the vehicle.

The first mounting unit 210 may be disposed toward any one of the front-rear direction (the length direction), the left-right direction (the width direction), or the vertical direction (the height direction) of the vehicle.

In the second embodiment of the present invention, the first mounting unit 210 may be disposed toward the left-right direction, which is the width direction of the vehicle.

Here, the first mounting unit 210 may include a first mounting body 212 and a first mounting pin 214 (referring to FIG. 8).

First, the first mounting bodies 212 may be formed on the upper part on the left and right sides of the cooling device 200, respectively, based on the width direction of the vehicle.

Also, the first mounting pins 214 may be formed to be protruded from the first mounting body 212 toward the left and right, respectively, based on the width direction of the vehicle.

In the second embodiment of the present invention, the second mounting units 220 may be respectively formed in the lower portion on the left and right sides of the cooling device 200 along the width direction of the vehicle.

The second mounting unit 220 may be disposed toward any one of the front-rear direction (the length direction), the width direction (the left-right direction), or the height direction (the up and down direction) of the vehicle.

Here, the second mounting unit 220 may be disposed towards another direction except for the arrangement direction of the first mounting unit 210 among the front-rear direction (the length direction), the width direction (the left-right direction), or the height direction (the up and down direction) of the vehicle.

That is, in the second embodiment of the present invention, the second mounting unit 220 may be formed toward the length direction, which is the front-rear direction of the vehicle.

The second mounting unit 220 configured in this way may include a second mounting body 222 and a second mounting pin 224.

First, the second mounting body 222 may be formed in the lower portion at both left and right sides of the cooling device 200 based on the width direction of the vehicle.

The second mounting pins 224 may be formed to protrude from the second mounting body 222 toward the front of the vehicle, respectively, with respect to the vehicle's front-rear direction.

On the other hand, in the second embodiment of the present invention, the cooling device 200 may further include a connection frame 230.

The connection frame 230 may fix the radiator 202 and the cooling fan 204 on the left and right sides based on the width direction of the vehicle. In addition, the first and second mounting units 210 and 220 may be respectively formed on the upper and lower portions of the connection frame 230.

That is, in the mount structure of the cooling device according to the second embodiment of the present invention, both upper sides of the cooling device 200 may be supported in the width direction of the vehicle and both lower sides of the cooling device 200 may be supported from the front based on the front-rear direction of the vehicle.

Accordingly, the cooling device 200 may be supported by the vehicle body 10 in the width direction and the front-rear direction of the vehicle.

Therefore, when the mount structure of the cooling device for the vehicle according to the second embodiment of the present invention configured as described above is applied, in the PBV, it is possible to secure vibration insulation performance and improve durability by stably mounting the cooling device 200 while minimizing the mounting space in front of the vehicle body 10.

In addition, in the second embodiment of the present invention, the cooling device 200 is obliquely disposed at the predetermined angle, and two axis supporting structures for supporting two directions of the vertical direction, left-right direction, or front-rear direction at both sides in the width direction of the vehicle are applied, thereby the overall stress distribution acting on the cooling device 100 is advantageous, and the mount stability and durability of the mounting unit may be improved.

In addition, in the second embodiment of the present invention, the layout may be simplified in the narrow vehicle front space of the PBV, and the interior space of the vehicle that may be applied for various purposes may be maximized.

Next, the mount structure of the cooling device for the vehicle according to the third embodiment of the present invention is described with reference to FIG. 9 and FIG. 10.

Figure 9:
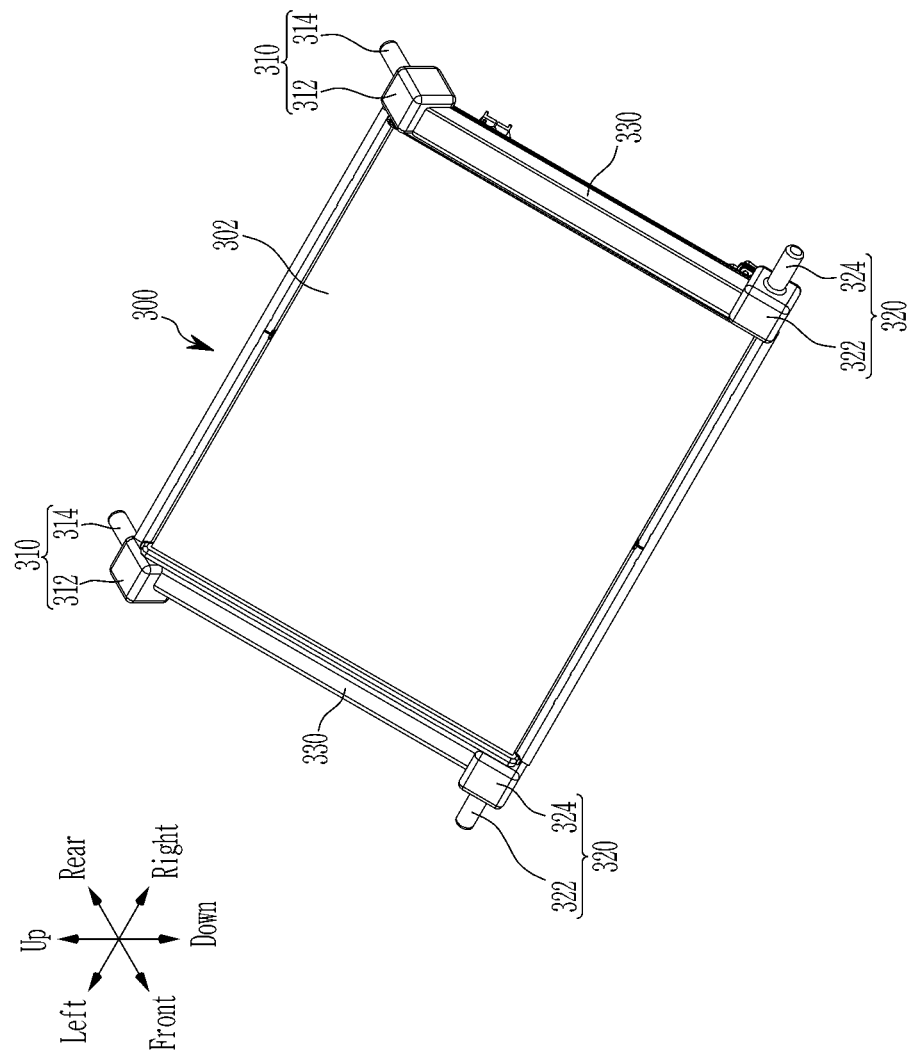
FIG. 9 is a front perspective view of a mount structure of a cooling device for a vehicle according to a third embodiment of the present invention.
Figure 10:
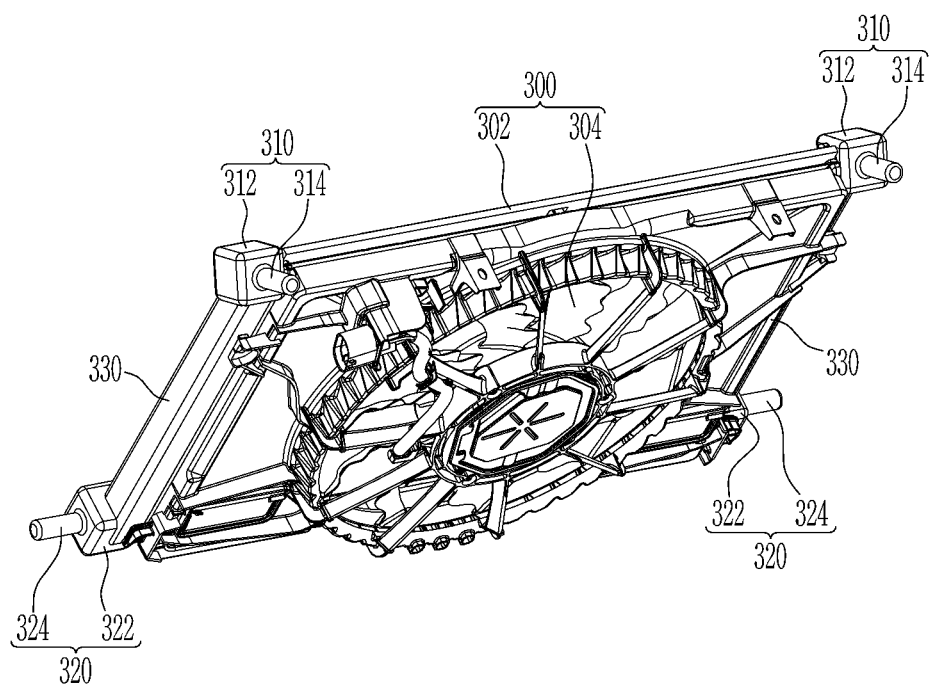
FIG. 10 is a rear perspective view a mount structure of a cooling device for a vehicle according to a third embodiment of the present invention.

FIG. 9 is a front perspective view a mount structure of a cooling device for a vehicle according to a third embodiment of the present invention, and FIG. 10 is a rear perspective view of a mount structure of a cooling device for a vehicle according to a third embodiment of the present invention.

First, in the third embodiment of the present invention, the mount structure of the cooling device, as shown in FIG. 9 and FIG. 10, includes the cooling device 300, a first mounting unit 310, a second mounting unit 320, and at least one bush unit 140.

Here, since the bush unit 140 is the same as the first embodiment described above, a detailed description of the bush unit 140 is omitted below.

In the third embodiment of the present invention, the cooling device 300 may include a radiator 302 and a cooling fan 304.

The radiator 302 may cool the coolant inflowing to the outside through heat-exchange with the outside air inflowing while the vehicle is running. Also, the cooling fan 304 is mounted at the rear of the radiator 302 based on the vehicle's front-rear direction.

The cooling device 300 configured in this way cools the coolant through the operation of the cooling fan 304 and heat-exchange with the outside air.

On the other hand, in the present embodiments, the cooling device 300 is described as an embodiment including the radiator 302 and the cooling fan 304, but it is not limited thereto, and may further include a heat-exchanger such as a condenser for heat-exchanging the refrigerant with the outside air.

In the third embodiment of the present invention, the first mounting units 310 may be respectively formed at the upper portion on the left and right sides of the cooling device 300 along the width direction of the vehicle.

The first mounting unit 310 may be disposed toward any one of the front-rear direction (the length direction), the left-right direction (the width direction), or the vertical direction (the height direction) of the vehicle.

In the third embodiment of the present invention, the first mounting unit 310 may be disposed toward the length direction, which is the front-rear direction of the vehicle.

Here, the first mounting unit 310 may include a first mounting body 312 and a first mounting pin 314.

First, the first mounting body 312 may be formed at the upper portion on both sides of the cooling device 300 based on the width direction of the vehicle.

Also, the first mounting pins 314 may be formed to be protruded from the first mounting body 312 toward the rear of the vehicle, respectively, based on the front-rear direction of the vehicle.

In the third embodiment of the present invention, the second mounting units 320 may be respectively formed in the lower portion on the left and right sides of the cooling device 300 along the width direction of the vehicle.

The second mounting unit 320 may be disposed toward any one of the front-rear direction (the length direction), the width direction (the left-right direction), or the height direction (the up and down direction) of the vehicle.

Here, the second mounting unit 320 be disposed towards another direction except for the arrangement direction of the first mounting unit 310 among the front-rear direction (the length direction), the width direction (the left-right direction), or the height direction (the up and down direction) of the vehicle.

That is, in the third embodiment of the present invention, the second mounting unit 320 may be formed toward the left-right direction, which is the width direction of the vehicle.

The second mounting unit 320 configured in this way may include a second mounting body 322 and a second mounting pin 324.

First, the second mounting body 322 may be formed in the lower part on both left and right sides of the cooling device 300 based on the width direction of the vehicle.

Also, the second mounting pins 324 may be formed to be protruded from the second mounting body 322 toward the left and right, respectively, based on the width direction of the vehicle.

On the other hand, in the third embodiment of the present invention, the cooling device 300 may further include a connection frame 330.

The connection frame 330 may fix the radiator 302 and the cooling fan 304 on the left and right sides based on the width direction of the vehicle. In addition, the first and second mounting units 310 and 320 may be respectively formed on the upper and lower portions of the connection frame 330.

That is, in the mount structure of the cooling device according to the third embodiment of the present invention, both upper sides of the cooling device 300 may be supported from the rear based on the front-rear direction of the vehicle, and both lower sides of the cooling device 300 may be supported in the width direction of the vehicle.

Accordingly, the cooling device 300 may be supported on the vehicle body 10 in the front-rear direction and the width direction of the vehicle.

Therefore, when the mount structure of the cooling device for the vehicle according to the third embodiment of the present invention configured as described above is applied, in the PBV, it is possible to secure vibration insulation performance and improve durability by stably mounting the cooling device 300 while minimizing the mounting space in front of the vehicle body 10.

In addition, in embodiments of the present invention, the cooling device 300 is obliquely disposed at the predetermined angle, and two axis supporting structures for supporting two directions of the vertical direction, left-right direction, or front-rear direction at both sides in the width direction of the vehicle are applied, thereby the overall stress distribution acting on the cooling device 300 is advantageous, and the mount stability and durability of the mounting unit may be improved.

In addition, in embodiments of the present invention, the layout may be simplified in the narrow vehicle front space of the PBV, and the interior space of the vehicle that may be applied for various purposes may be maximized.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A mount structure of a cooling device for a vehicle, the mount structure comprising:
   first mounting units respectively provided at an upper part on left and right sides of the cooling device along a width direction of the vehicle and disposed toward a front-rear direction, the width direction, or a height direction of the vehicle;
   second mounting units respectively provided at a lower part on the left and right sides of the cooling device along the width direction of the vehicle and disposed toward the front-rear direction, the width direction, or the height direction of the vehicle; and
   a bush unit to which the first mounting units and the second mounting units are mounted to mount the cooling device to a vehicle body of the vehicle,
   wherein the second mounting units are disposed toward a direction different than a disposition direction of the first mounting units among the front-rear direction, the width direction, and the height direction of the vehicle.

2. The mount structure of claim 1, wherein the cooling device is disposed to be inclined at a predetermined angle so that the upper part is positioned higher than the lower part based on the height direction of the vehicle.

3. The mount structure of claim 1, wherein the first mounting units comprise:
   first mounting bodies respectively provided at the upper part on the left and right sides of the cooling device based on the width direction of the vehicle; and
   first mounting pins provided to respectively protrude from the first mounting bodies toward the left and right sides based on the width direction of the vehicle.

4. The mount structure of claim 3, wherein the second mounting units comprise:
   second mounting bodies respectively provided at the lower part on the left and right sides of the cooling device based on the width direction of the vehicle; and
   second mounting pins provided to respectively protrude downward from the second mounting bodies based on the height direction of the vehicle.

5. The mount structure of claim 1, wherein the first mounting units comprise:
   first mounting bodies respectively provided at the upper part on the left and right sides of the cooling device based on the width direction of the vehicle; and
   first mounting pins respectively provided to be protruded from the first mounting bodies toward a rear of the vehicle based on the front-rear direction of the vehicle.

6. The mount structure of claim 5, wherein the second mounting units comprise:
   second mounting bodies respectively provided at the lower part on the left and right sides of the cooling device based on the width direction of the vehicle; and
   second mounting pins respectively provided to be protruded from the second mounting bodies toward a left-right direction with respect to the width direction of the vehicle.

7. The mount structure of claim 1, wherein the first mounting units comprise:
   first mounting bodies respectively provided at the upper part on the left and right sides of the cooling device based on the width direction of the vehicle; and
   first mounting pins respectively provided to be protruded from the first mounting bodies toward a left-right direction based on the width direction of the vehicle.

8. The mount structure of claim 7, wherein the second mounting units comprise:
   second mounting bodies provided at the lower part on the left and right sides of the cooling device based on the width direction of the vehicle; and
   second mounting pins respectively provided to be protruded from the second mounting bodies toward a front of the vehicle based on the front-rear direction of the vehicle.

9. The mount structure of claim 1, wherein the cooling device further comprises connection frames for fixing a radiator and a cooling fan on the left and right sides based on the width direction of the vehicle and respectively provided with the first mounting units and the second mounting units.

10. The mount structure of claim 1, wherein the bush unit comprises:

a mounting bracket fixedly mounted on the vehicle body and including a mount hole;

an insulator mounted on the mount hole and including a penetration hole provided in a center of the insulator; and an inner pipe mounted on the penetration hole.

11. A vehicle comprising:

a vehicle body;

a cooling device comprising a cooling fan and a radiator, wherein the cooling device is inclined at a predetermined angle so that an upper part is positioned higher than a lower part based on a height direction of the vehicle;

first mounting units respectively provided on left and right sides of the upper part of the cooling device along a width direction of the vehicle and disposed toward a front-rear direction, the width direction, or the height direction of the vehicle;

second mounting units respectively provided on left and right sides of the lower part of the cooling device along the width direction of the vehicle and disposed toward the front-rear direction, the width direction, or the height direction of the vehicle; and bush units configured to mount the cooling device to the vehicle body, wherein the first mounting units and the second mounting units are respectively mounted to the bush units, wherein the second mounting units are disposed toward a direction different than a disposition direction of the first mounting units among the front-rear direction, the width direction, or the height direction of the vehicle.

12. The vehicle of claim 11, wherein the first mounting units comprise:

first mounting bodies respectively provided on the left and right sides of the upper part of the cooling device based on the width direction of the vehicle; and first mounting pins provided to respectively protrude from the first mounting bodies toward the left and right sides based on the width direction of the vehicle.

13. The vehicle of claim 12, wherein the second mounting units comprise:

second mounting bodies respectively provided on the left and right sides of the lower part of the cooling device based on the width direction of the vehicle; and second mounting pins provided to respectively protrude downward from the second mounting bodies based on the height direction of the vehicle.

14. The vehicle of claim 11, wherein the first mounting units comprise:

first mounting bodies respectively provided on the left and right sides of the upper part of the cooling device based on the width direction of the vehicle; and first mounting pins respectively provided to be protruded from the first mounting bodies toward a rear of the vehicle based on the front-rear direction of the vehicle.

15. The vehicle of claim 14, wherein the second mounting units comprise:

second mounting bodies respectively provided on the left and right sides of the lower part of the cooling device based on the width direction of the vehicle; and second mounting pins respectively provided to be protruded from the second mounting bodies toward a left-right direction with respect to the width direction of the vehicle.

16. The vehicle of claim 11, wherein the first mounting units comprise:

first mounting bodies respectively provided on the left and right sides of the upper part of the cooling device based on the width direction of the vehicle; and first mounting pins respectively provided to be protruded from the first mounting bodies toward a left-right direction based on the width direction of the vehicle.

17. The vehicle of claim 16, wherein the second mounting units comprise:

second mounting bodies provided on the left and right sides of the lower part of the cooling device based on the width direction of the vehicle; and second mounting pins respectively provided to be protruded from the second mounting bodies toward a front of the vehicle based on the front-rear direction of the vehicle.

18. The vehicle of claim 11, wherein the cooling device further comprises connection frames fixing the radiator and the cooling fan on the left and right sides based on the width direction of the vehicle and respectively provided with the first mounting units and the second mounting units.

* * * * *

UNITED STATES PATENT AND TRADEMARK OFFICE
CERTIFICATE OF CORRECTION

| | | |
|---|---|---|
| PATENT NO. | : 12,043,106 B2 | Page 1 of 1 |
| APPLICATION NO. | : 17/950368 | |
| DATED | : July 23, 2024 | |
| INVENTOR(S) | : Kim et al. | |

It is certified that error appears in the above-identified patent and that said Letters Patent is hereby corrected as shown below:

On the Title Page

Item (72), in Column 1, in "Inventors", Line 7, delete "(KR)" and insert -- (KR); Jae-Eun Jeong, Hwaseong-si (KR) --.

Signed and Sealed this
Tenth Day of September, 2024

Katherine Kelly Vidal
*Director of the United States Patent and Trademark Office*